June 29, 1937.　　　　　　　　　　　　　　　　　　　　2,085,495
G. G. FULKERSON, ALSO KNOWN AS G. W. FULKERSON
CONFECTION
Filed Feb. 28, 1935　　　2 Sheets-Sheet 1
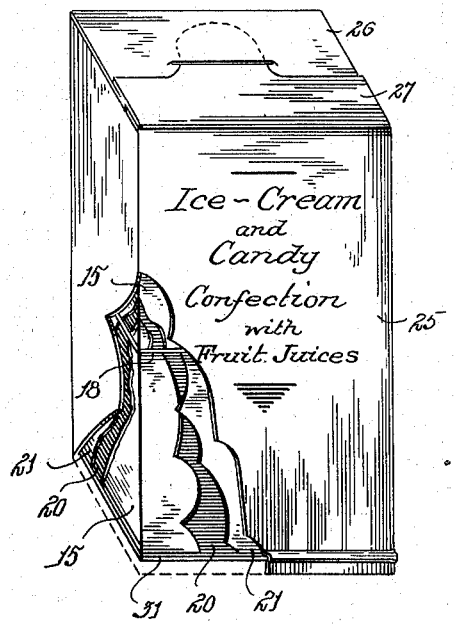
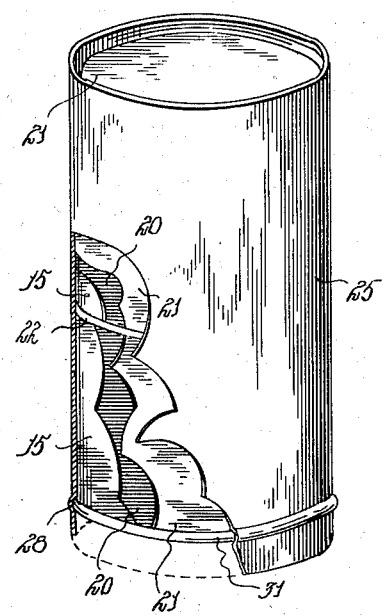
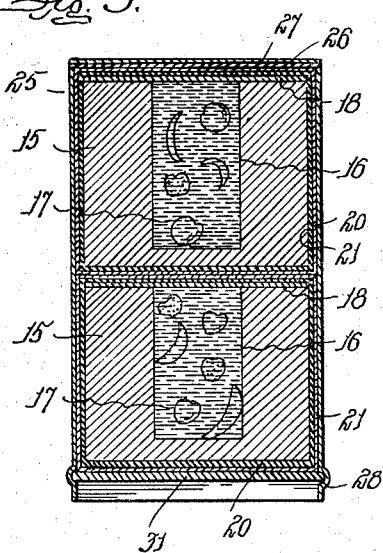
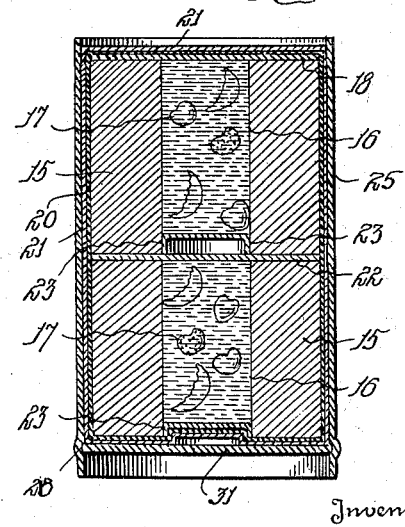
Inventor
George G. Fulkerson.
By
Attorney June 29, 1937.
G. G. FULKERSON, ALSO KNOWN AS G. W. FULKERSON
2,085,495
CONFECTION
Filed Feb. 28, 1935 — 2 Sheets-Sheet 2
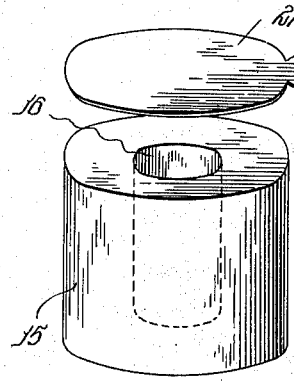
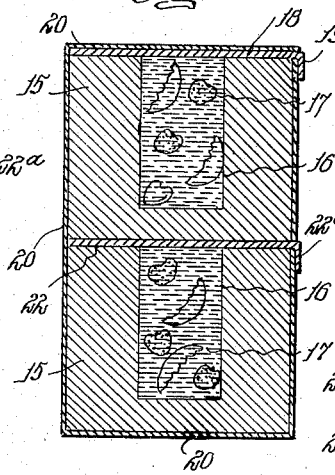
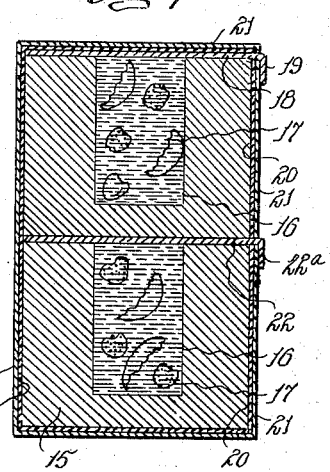
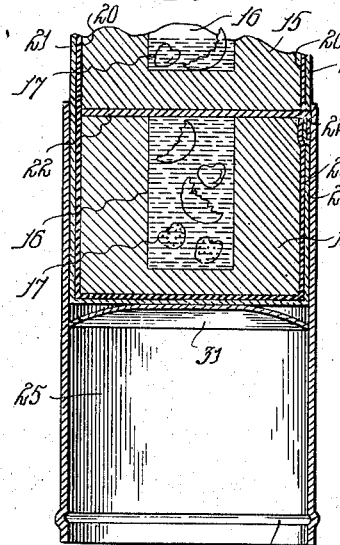
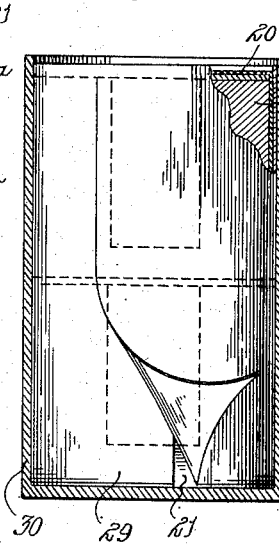
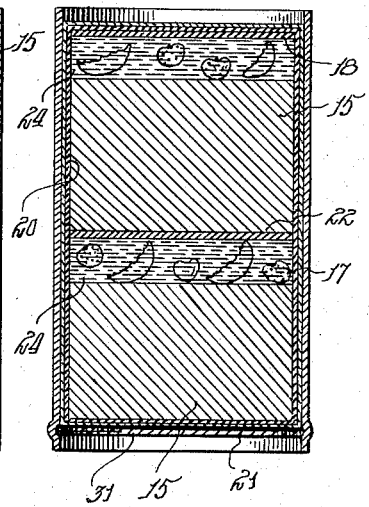
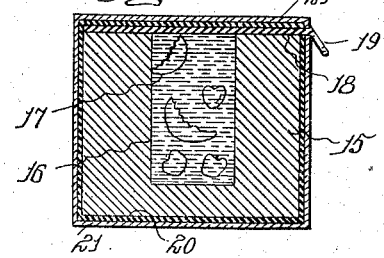
Inventor
George G. Fulkerson.
By Horace B. Meall
Attorney Patented June 29, 1937

2,085,495

UNITED STATES PATENT OFFICE 2,085,495

CONFECTION

George Glen Fulkerson, also known as George Welden Fulkerson, Huntington Park, Calif.

Application February 28, 1935, Serial No. 8,748

1 Claim. (Cl. 99—137)

My invention relates to the production of a confection or article of food of that kind in which ice cream in the shape of a block is used with other edible substances in the preparation of the article.

The main object of my invention is to provide a new article of manufacture of this kind that will appeal to those who enjoy the eating of sweets, and will also have the advantage of supplying an admixture of the several ingredients at each mouthful during the eating of the article.

In a more important sense my invention contemplates the production of an ice cream and candy confection made up in a particular manner whereby the combination of the edible substances includes a candy coating which not only adds to the enjoyable taste of the article but provides a covering that will not soften and stick to the fingers in the handling of the confection, as well as permit several of the articles to be more readily dispensed from a container or holder in which they may be sold.

I am aware it has been proposed to provide a confection in which a block of ice cream is employed in connection with other food ingredients, as chocolate, fruit syrups, etc., but articles of this kind which have come to my notice have not been satisfactory for the reason that they are not so easily handled, nor does the manner of combining the edible substances give the admixture the satisfactory results attained by my improved form of confection.

My invention therefore consists in a confection comprising a block of ice cream in any desired shape, having a cavity or chamber containing fruit juices or syrups, and coated on the outside with chocolate over which is a candy coating to provide a protecting covering, although the confection may be and preferably is made up of several blocks of ice cream, with fruits syrup, separated by disks, and the blocks so assembled coated with chocolate and candy.

My invention further consists in the employment of a particular form of container for gradually dispensing the confection while it is being eaten, as well as provide a more substantial covering in the marketing of the article.

The accompanying drawings show several preferred forms of my improved confection, and in which:

Figure 1 is a perspective view showing the complete article in rectangular form.

Fig. 2 is a similar view, the article being in cylindrical form.

Fig. 3 is a vertical transverse sectional view through Fig. 1.

Fig. 4 is a similar view through Fig. 2.

Figs. 5, 6, and 7 illustrate the manner in which the confection is prepared.

Fig. 8 shows the confection in combination with the preferred form of container by which it is dispensed.

Fig. 9 is a modification employing a paper wrapper for the confection.

Fig. 10 is a further modification in which the fruit syrup is contained in a chamber at the upper end of the block of ice cream, and Fig. 11 is a sectional view of a single block of confection in accordance with my invention.

Like numerals of reference indicate like parts in the several figures of the drawings.

In carrying out my invention to provide a new delectable confection I employ as the principal ingredient or edible substance a block of ice cream 15, which may be of any desired shape, as for instance rectangular (Fig. 1) or cylindrical (Fig. 2), and this block of ice cream is molded to include a central cavity 16 in the upper end thereof, adapted to be filled with fruit juices or syrups and pieces of fruit, indicated generally by the numeral 17, with a disk cover or wafer 18, made of cardboard, wood, candy, or other material having a tab 19. This assembly is coated with a layer of chocolate 20 and then dipped in a candy mixture to provide a coating 21. For the candy coating I use any of the well known compounds or mixtures in which the sugar crystallizes to provide a hard wall for the confection which will not become soft in handling and stick to the fingers. Furthermore, the candy covering is an important feature of my invention as it cooperates with the special container, hereinafter described, in which the confection is preferably marketed, and in addition to providing a substantial outer wall for the handling of the confection it also serves to retard softening of the ice cream.

Although I may manufacture and sell the confection in the form of a single block of ice cream having the cavity containing fruit and syrup covered by a disk, and including the coatings of chocolate and hard candy, I prefer to have the article or confection composed of two or more blocks of ice cream separated by a disk 22, interposed between the blocks of ice cream before the operation of coating the same with chocolate and candy as hereinbefore explained. In forming the confection in this preferred manner it provides an article of this kind which is in two or more sections to not only provide for more conveniently eating the same, as well as dividing it, but also allows for two or more cavities for the fruit and fruit syrups according to the number of sections used. In either instance, as a single block or of several blocks combined, I may have the cavity extend through the block of ice cream and provide a bottom in said cavity by inserting a closure 23 (Fig. 4) preferably made of candy, instead of a floor of ice cream as shown in the other figures of the drawings, and I also desire it to be understood that I may substitute a chamber 24 at the upper end of each block of ice cream (Fig. 10), to receive the fruit and fruit juices, in place of a central cavity. In other words, there may be other obvious modifications or changes made in the formation of the confection within the spirit of my invention, it being essential that the several ingredients and elements constituting the confection described be employed in so far as called for in the appended claim.

Notwithstanding the article may be manufactured and sold as a frozen confection having only the hard candy outer wall, it is my intention to enclose the same in a container 25, preferably made of cardboard, which may be of any desired shape, as for instance square as shown in Fig. 1 with the closing flaps 26, 27, or cylindrical as shown in Fig. 2. The container is provided at its lower end with an outwardly stamped rib forming a groove 28 to receive a bottom 31 supported in place by said groove but which may be disengaged therefrom for the purpose of pushing the confection out of the container from the bottom thereof, as shown in Fig. 8. The disk is made of cardboard or other resilient material so that it may be sprung out of engagement with the groove, and of course it may be operated for gradually exposing the confection at the top of the container by pressure of a finger against said disk, thus permitting the article to be retained in the container while it is being consumed.

As a further modification of my invention, illustrated in Fig. 9, the confection instead of being coated with hard candy is provided with a chocolate coating only, and is enclosed by a paper wrapper 29, the article of confection then being enclosed in an ordinary form of container 30.

When the articles are sold by the retail trade, such as confectionery and delicatessen stores, it will be necessary to keep them in a cold place to prevent softening of the ice cream, and as the confection combines several different ingredients which are pleasing to the taste it will be appreciated by those enjoying confections of this kind.

I claim:—

As a new article of manufacture, a confection comprising blocks of ice cream, each block having an opening through the center of the same and an inverted cup-shaped candy closure at the lower end of the opening to form a cavity, ingredients such as fruit and fruit juices and syrups within the cavity, a wafer forming a cover for each block over the ice cream and cavity, a coating of chocolate around the ice cream blocks and wafers, and an outer coating of hard candy forming an edible covering for maintaining the stability of the confection and to retard the melting of the ice cream.

GEORGE GLEN FULKERSON.